Sept. 10, 1929. H. SMITH 1,727,415
SPRING SUSPENSION FOR VEHICLES
Filed May 7, 1926
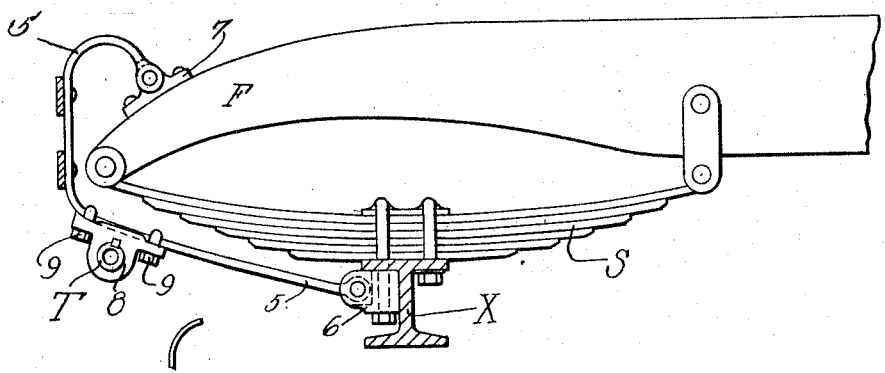
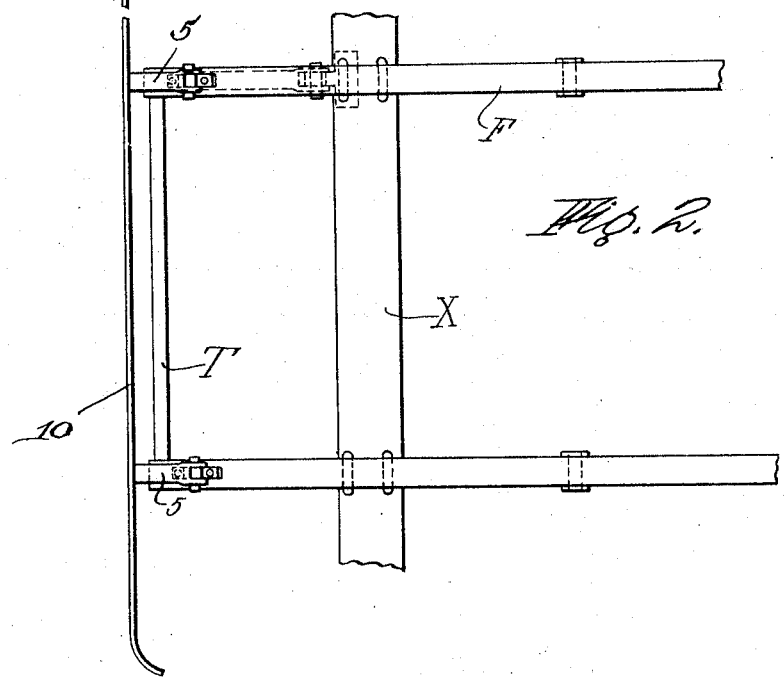
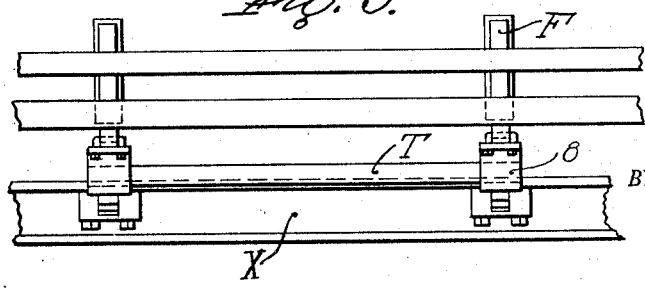
INVENTOR.
Hinsdale Smith
BY Chapin & Neal
ATTORNEYS.

Patented Sept. 10, 1929.

1,727,415

UNITED STATES PATENT OFFICE.

HINSDALE SMITH, OF SPRINGFIELD, MASSACHUSETTS, ASSIGNOR TO INGLIS M. UPERCU, OF NEW YORK, N. Y.

SPRING SUSPENSION FOR VEHICLES.

Application filed May 7, 1926. Serial No. 107,505.

This invention relates to improvements in spring suspensions for vehicles and relates more particularly to spring suspensions for automobile chassis or the like.

According to the present practice, the springs used in connection with automobile chassis are designed for a double duty, namely for resiliently supporting the frame from the axles for a relative vertical movement between the same as well as for resisting the tilting and side swaying motion of the frame and body as the automobile rounds curves or when its wheels and axle are raised or lowered by unevenness of the roadway. In other words, the springs now commonly used are made stiff and sufficiently heavy to withstand the twisting action caused by the rocking and side swaying of the body with respect to the axles but are unnecessarily stiff for the ordinary relative vertical movement of the frame and axle. Soft flexible springs, however, primarily adapted for resiliently supporting the body do not possess the necessary rigidity to resist the twisting action caused by side swaying or tilting of the body with respect to the axles. Therefore, the heavy springs, while capable of resisting the twisting action, are much too stiff or hard to yield readily and to give to the chassis the desired easy riding qualities.

According to one feature of my invention, I provide a spring suspension that may incorporate a soft flexible supporting spring that is especially adapted to yield readily and which allows the chassis to freely rise and fall in the normal operation of the automobile. According to another feature of the invention, I provide means associated with the soft supporting spring that cooperates therewith under certain conditions to reinforce the said spring and to lend rigidity thereto whereby the structure is adapted to resist any twisting action caused by the side swaying or tilting motion of the automobile.

In effect, I provide a spring suspension that includes springs adapted to permit relatively free and easy vertical movements of the body with respect to the chassis which has associated therewith yieldable supplemental members adapted and arranged to reinforce the spring at such times as it is subjected to non-vertical movement or twisting action caused by a tilting or side swaying movement of the body with respect to the axles.

The invention is applicable to various types of vehicles and may be used with various types of spring suspensions therefor but will now be described according to the modifications at present preferred, the same being illustrated in the accompanying drawings, in which:

Fig. 1 is a side elevational view of a structure embodying the features of my invention; and Figs. 2 and 3 are plan and front elevational views respectively of the same.

Referring to the drawings in detail, the forward end of a typical automobile side frame is indicated at F which is supported in the usual manner from an axle X by the half elliptical springs S. Any other type of spring desired may be employed in lieu of that shown, such as, for instance, that form secured to the frame and axle and in parallelism with the axle. The said springs, as illustrated, are connected at their ends to the frame and intermediate their ends to the axle in any of the well known ways so as to be arranged to resiliently support the frame above the axle and permit a relative vertical movement thereof. The springs may possess any desired characteristics as to flexibility or resiliency but in the practice of my invention, since they are to be reinforced by other means for resisting a twisting action, they may be designed primarily so as to be most suitable for supporting the frame in the desired manner, rather than for resisting a tilting of the frame with respect to the axle.

Members 5, which may be termed supplemental members, are provided which are pivotally connected at opposite ends to plates 6 and 7 fixed to the frame and axle. The pivotal connections are, according to my invention, preferable because as is well known there is a certain amount of play or lost motion therein which may be taken advantage of so that the members will not ordinarily be acted upon by the normal vertical movements of the frame.

In the form shown, the members 5 are arranged to extend around the ends of the frame but obviously they may be shaped as may be desired or required so as to be attachable to any existing frame and spring suspension. These members shown are preferably in the form of flat bars arranged and adapted to permit a free relative vertical movement of the frame and axle and a consequent flexing movement of the springs S. A shaft or torque member T has its ends rigidly fixed in hubs, or brackets 8 which are fixed by bolts 9 to the members 5. This member may be in the form of a tube, rod or the like and is preferably adapted to transmit a torque or twisting action from one of the members 5 to the other.

Bumper bar members 10, which may or may not in themselves serve as torque members, extend between the members 5 and are secured thereto in any convenient manner. Any other type of bumper construction than that shown may be employed such as that including a flat forward bar or bars secured to spring members at the rear thereof, which may be carried by the members 5.

In operation, the frame, which is resiliently supported from the axle, may freely rise and fall with respect thereto, the only resistance offered to this movement being that of the supporting springs since the members 5 will only work on their connections and flex immaterially. If however the frame and axle are caused to tilt or rock relatively to one another so that the frame is no longer in parallelism with the axle, the action of the members 5 and the torsional resistance of the torque member T come into play and yieldingly resist any tendency of the frame to swing out of parallelism with the axle. This action will be obvious by considering a lowering tendency of one side of said frame. Such a lowering movement will also tend to lower the member 5 on the lowering side so as to exert a twisting action on the torque member. The twisting action of the torque member will then tend to pull the member 5 at its other end downwardly and effect a corresponding lowering movement of the other side of the frame.

As a practical matter, an automobile equipped with the structure just described will have its frame and body lowered almost in parallelism with the ground should a weight be applied to one side only thereof.

It will be obvious that the structure may be applied to any automobile or other vehicle whether the springs are parallel or transverse to the axle member inasmuch as the supplemental members connected to the frame and axle may be disposed in any angular relation with respect to the springs or axle.

From the foregoing, it will be observed that the supplemental members are adapted and arranged to permit a free relative up and down movement of the frame and axle while they are also adapted to co-operate with the springs in resisting a relative tilting movement of the frame and axle.

I am aware that many changes may be made in the form of the invention without departing from the scope thereof and I therefore prefer to be limited by the appended claims rather than by the foregoing description.

What I claim is:

1. The combination of a vehicle frame resiliently supported on an axle with apparatus for reinforcing said supporting means against a relative tilting movement of said frame and axle, comprising members hingedly connected at opposite ends to said frame and axle respectively and arranged intermediate said ends to permit a relative vertical movement of said frame and axle and a substantially rigid torque resisting member fixed to said members adapted to resist a relative tilting movement of said frame and axle.

2. The combination of a vehicle frame resiliently supported on an axle with apparatus for reinforcing said supporting means against a relative tilting movement of said frame and axle, comprising members each having one of its ends hingedly connected to said frame and its other end hingedly connected to said axle, the portion intermediate said ends being formed so as to permit a relative vertical movement of said frame and axle and a substantially rigid torque member connected to said members adapted and arranged to cooperate with said members to reinforce the resilient supporting means in resisting a relative tilting movement of said frame and axle but arranged to permit a vertical relative movement thereof.

3. The combination of a vehicle frame resiliently supported on an axle with apparatus for reinforcing said supporting means against a relative tilting movement of said frame and axle, comprising yieldable members each having one of its ends hingedly connected to said frame and its other end hingedly connected to said axle, the portion intermediate said ends being formed so as to permit a relative vertical movement of said frame and axle and a substantially rigid torque member extending between and connected to said members intermediate their ends adapted and arranged to cooperate with said members to reinforce the resilient supporting means in resisting a relative tilting movement of said frame and axle but arranged to permit a vertical relative movement thereof, and a bumper separate from the torque member connected to said members.

4. The combination in a vehicle of a frame, axle and springs with a torque structure pivotally connected at each side to said frame and axle, said structure including a substantially rigid torque rod mounted rigidly therein and extending parallel with said axle whereby a tilting movement of the axle will be resisted by the rigid connection of said torque rod with said structure.

In testimony whereof I have affixed my signature.

HINSDALE SMITH.